United States Patent [19]

Portis

[11] Patent Number: 4,461,397

[45] Date of Patent: Jul. 24, 1984

[54] PROTECTIVE DEVICE FOR MOBILE TANKS HAVING BOTTOM DISCONTINUITIES

[75] Inventor: Ralph G. Portis, Highland Park, Ill.

[73] Assignee: Midland Manufacturing Corp., Skokie, Ill.

[21] Appl. No.: 236,826

[22] Filed: Feb. 23, 1981

[51] Int. Cl.³ ............................................. F16P 1/00
[52] U.S. Cl. .................................. 220/85 P; 137/377; 137/382; 137/382.5; 251/144
[58] Field of Search ............... 220/73, 85 P; 137/377, 137/382, 347, 348, 350, 282, 378, 379, 382.5; 285/201, 202, 203, 208, 45, 63, 206, 205; 105/360, 362, 358; 251/144

[56] References Cited

U.S. PATENT DOCUMENTS

| | | | |
|---|---|---|---|
| 537,031 | 4/1895 | Gompper | 285/206 |
| 1,193,905 | 8/1916 | Lavisne | 137/382 |
| 1,794,476 | 3/1931 | Taylor | 285/63 X |
| 1,917,912 | 7/1933 | Willoughby | 105/367 |
| 1,941,537 | 1/1934 | Boosey | 285/206 X |
| 2,216,033 | 9/1940 | Hopkins | 285/202 |
| 2,507,752 | 5/1950 | Benson | 285/202 X |
| 2,513,450 | 7/1950 | Carlisle, Sr. | 105/360 X |
| 2,613,462 | 10/1952 | Johnson | 220/85 P |
| 2,919,048 | 12/1959 | Harvey | 220/327 X |
| 3,195,932 | 7/1965 | Morton | 285/206 X |
| 3,591,131 | 7/1971 | Carlson | 251/144 |
| 4,056,117 | 11/1977 | Deeks | 251/144 X |
| 4,180,242 | 12/1979 | Reedy | 137/382.5 X |
| 4,184,663 | 1/1980 | Rollins et al. | 251/144 |
| 4,220,097 | 9/1980 | Wempe et al. | 137/382 X |
| 4,269,220 | 5/1981 | Rehbein | 137/350 |

Primary Examiner—Allan N. Shoap
Attorney, Agent, or Firm—Emrich & Dithmar

[57] ABSTRACT

Mobile tanks, such as the tanks of railway tank cars and the tanks of automotive tank trucks, often have bottom discontinuities susceptible in an accident to impact damage that could permit release of harmful tank contents. Such bottom discontinuities, by way of example, are downwardly projecting parts from bottom outlet valves, washouts, blind flange closures and sumps. This invention contemplates a protective device for such bottom discontinuities, the device comprising a shaped metal plate having a central opening adapted to receive and enclose any bottom discontinuity requiring protection, the plate adapted to be mounted in engagement with the tank, the surface of the plate opposite from the tank tapering toward the tank forwardly and rearwardly from the central opening on skid slopes which terminate in spaced relation with the tank, the plate at the terminations of the slopes being curved toward the tank on convex curves to define a curved undercut periphery free of any corner facing the tank, whereby in consequence of severe impact on the protective device, the bottom discontinuity is protected and the tank deforms around a portion of the curved undercut periphery, the tank deformation being of such shape and magnitude that rupture of the tank is avoided.

1 Claim, 6 Drawing Figures

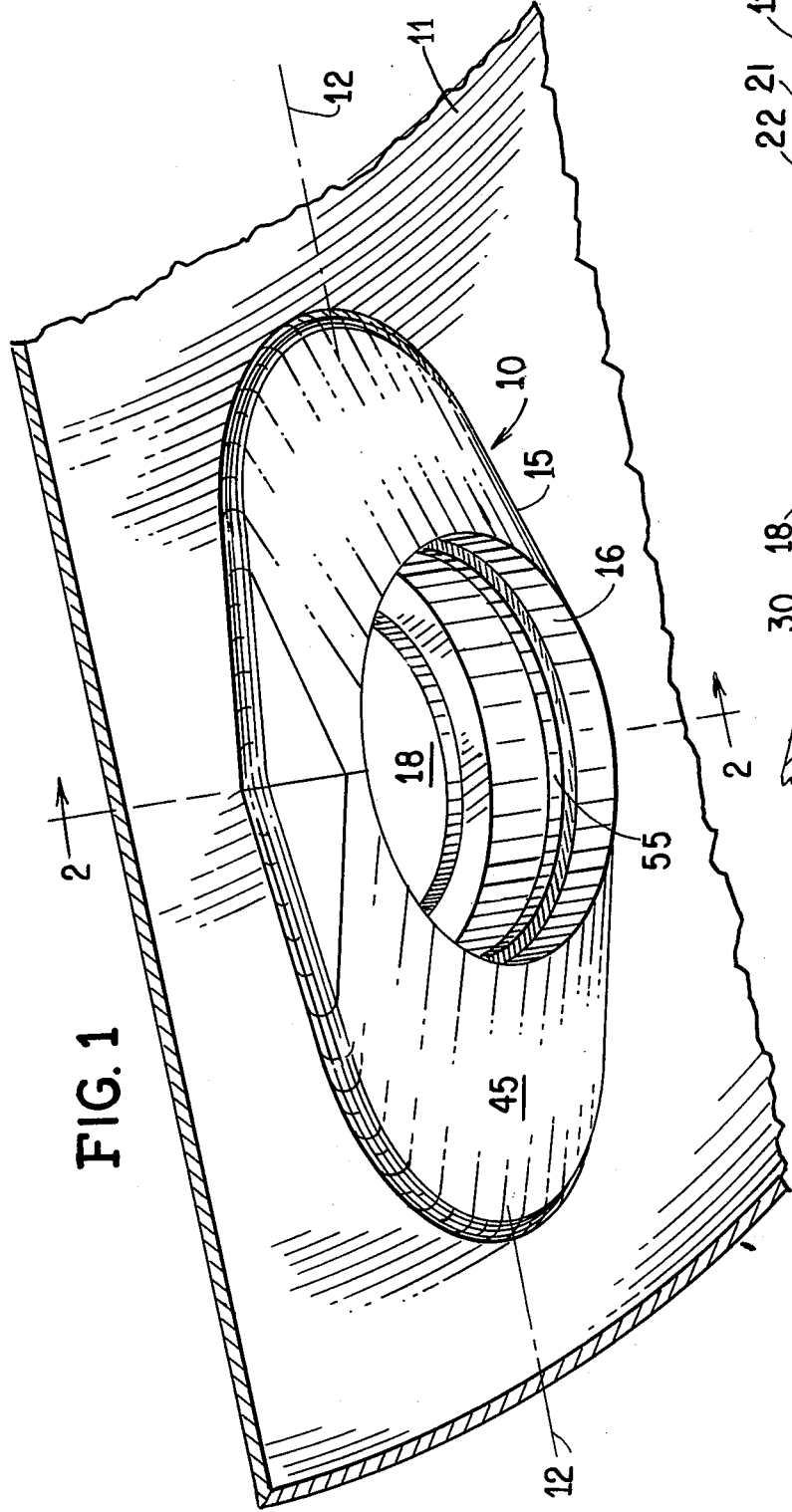
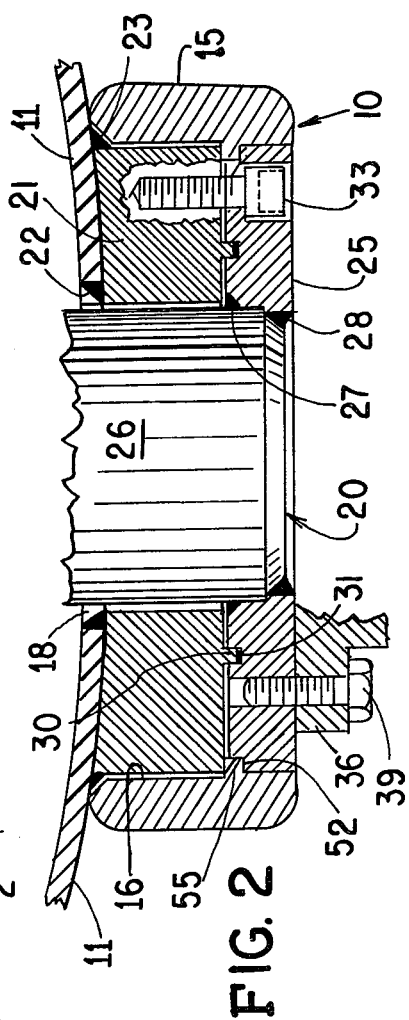
FIG. 1
FIG. 2

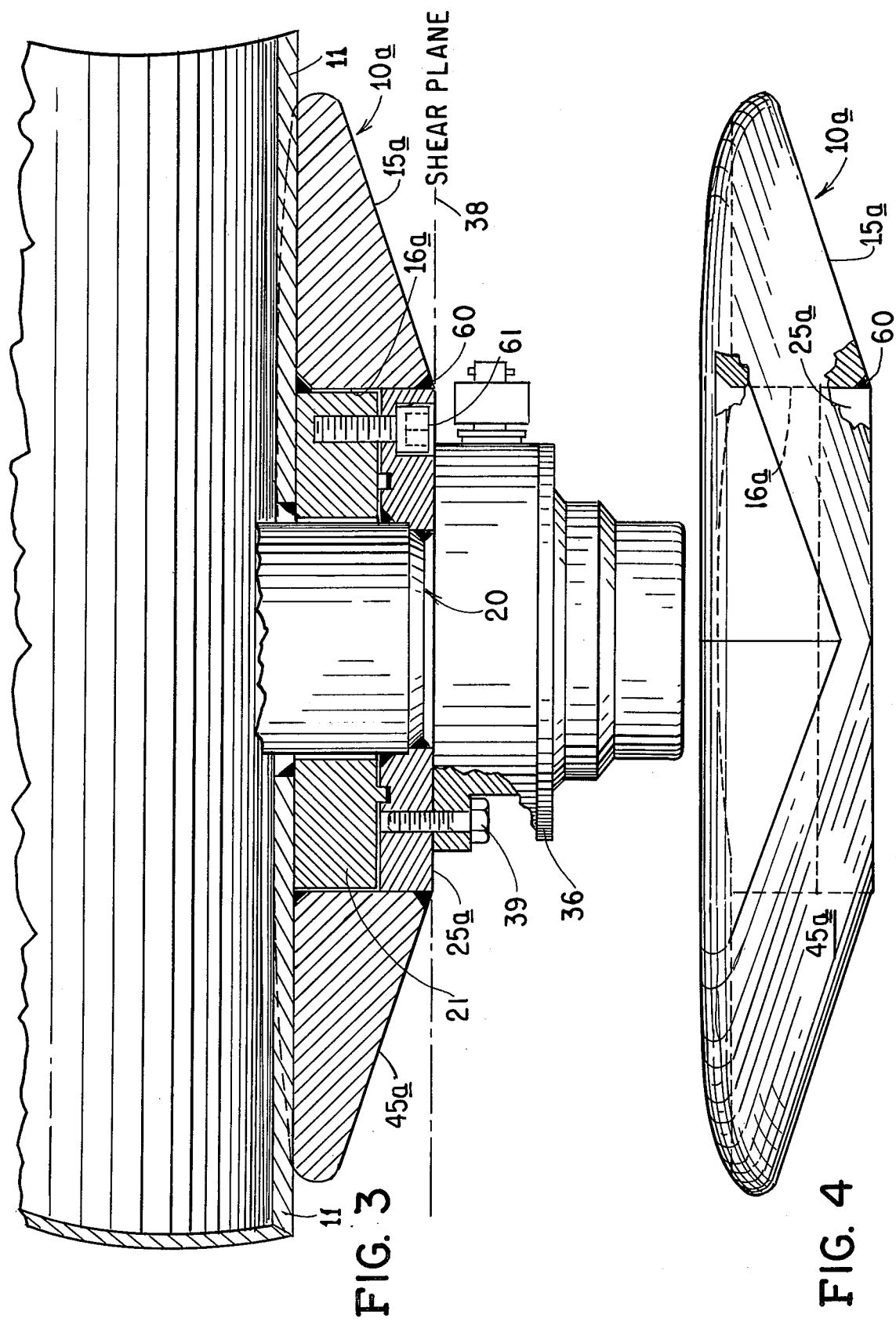

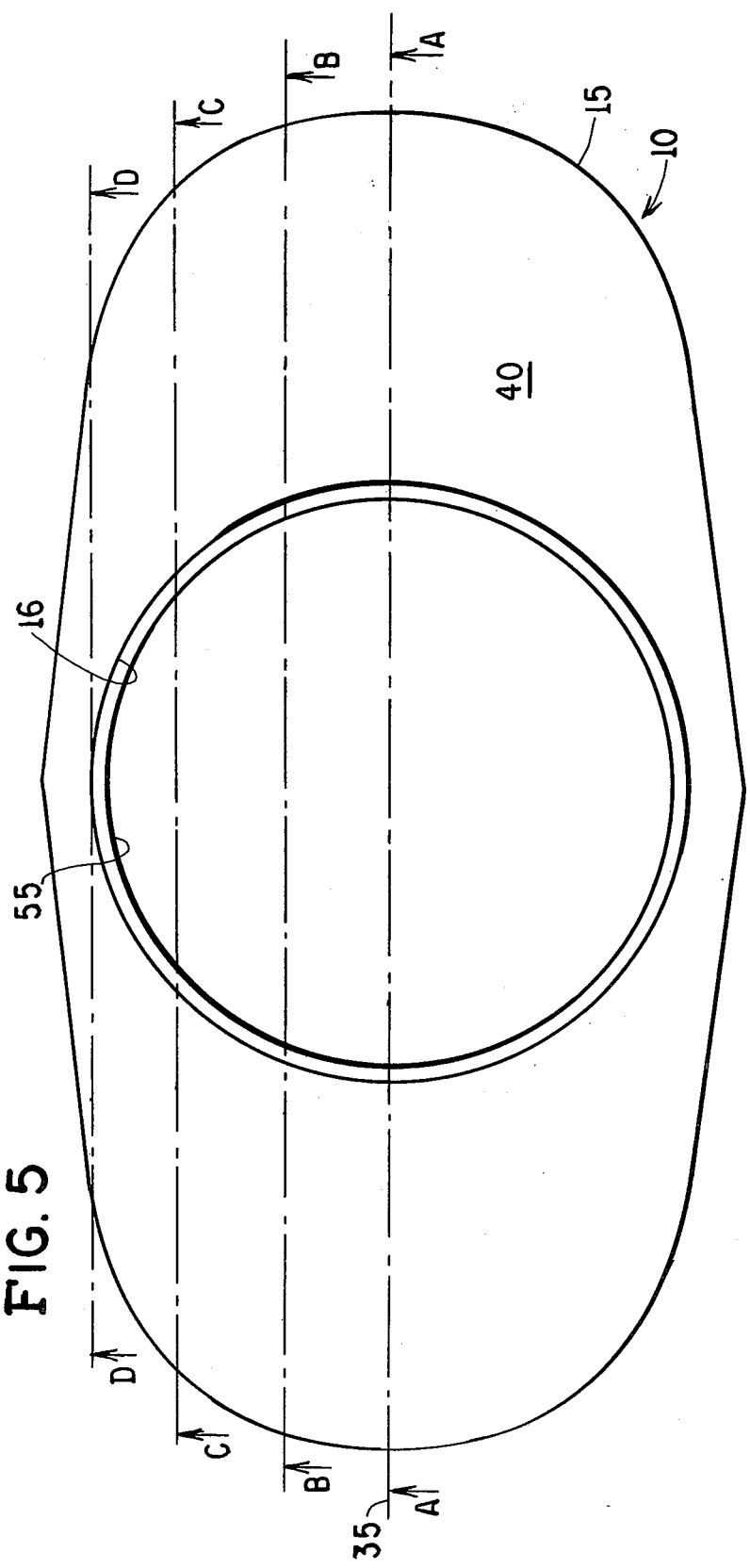
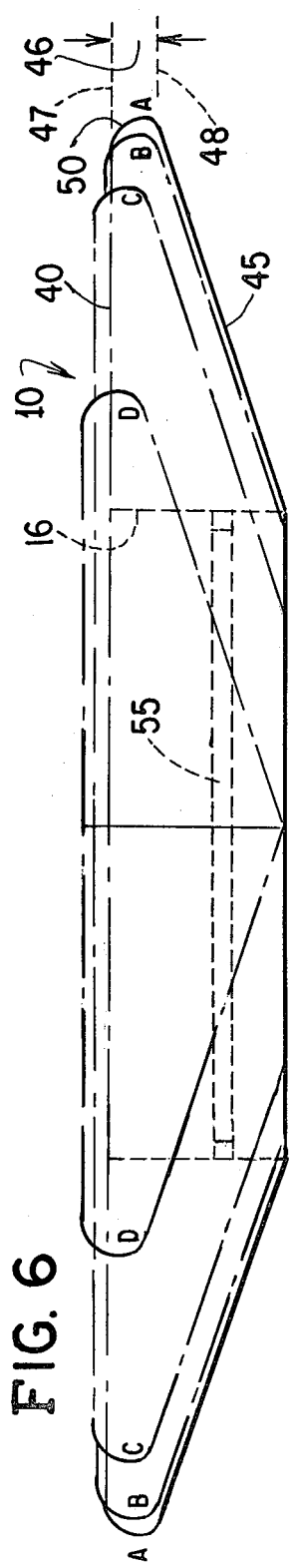
FIG. 5
FIG. 6

PROTECTIVE DEVICE FOR MOBILE TANKS HAVING BOTTOM DISCONTINUITIES

This invention relates to protective devices, and more particularly to protective devices for mobile tanks having bottom discontinuities.

Examples of mobile tanks which will benefit from using the protective devices of the invention are the tanks of railway tank cars and the tanks of automotive tank trucks. Examples of bottom discontinuities on mobile tanks which require protection are downwardly projecting parts of bottom outlet valves, washouts, blind flange closures and sumps.

Current Association of American Railroads (AAR) railway tank car regulations, E9.00 and E10.00 (Appendix E), require that bottom discontinuities which extend radially in excess of one inch beyond the surface of the tank be provided with an approved protective device which in an accident can receive severe impact without producing impact damage to the bottom discontinuity that could permit release of tank contents.

An object of the invention is to provide a protective device that will comply with the aforesaid regulations, and will be approved by AAR.

Another object of the invention is to provide a protective device wherein the periphery thereof is curved toward the tank on convex curves so as to define a curved undercut periphery free of any corner facing the tank, whereby in consequence of severe impact on the protective device, the tank deforms around a portion of the curved undercut periphery, the deformation being of such shape and magnitude that rupture of the tank is avoided.

Still another object of the invention is to provide a protective device that equally well can be applied to new mobile tanks during the construction thereof and to existing mobile tanks on a retrofit basis. As to the latter, subject protective device can be applied to an existing mobile tank without removing same from service for an extended period, or incurring undue expense.

BRIEF SUMMARY OF THE INVENTION

The protective device embodying the invention comprises a shaped metal plate having a central opening adapted to receive and enclose any bottom discontinuity of a mobile tank requiring protection, the plate in plan view being elongated and adapted to be mounted in engagement with and longitudinally of the tank, the surface of the plate away from the tank tapering toward the tank forwardly and rearwardly from the central opening on slopes which terminate in spaced relation with the tank, the plate at the terminations of the slopes being curved toward the tank on convex curves to define a curved undercut periphery free of any corner facing the tank, whereby in consequence of severe impact on the protective device, the discontinuity is protected and the tank deforms around a portion of the curved undercut periphery, the deformation being of such shape and magnitude that rupture of the tank is avoided.

In more detailed aspect, the forward and rearward vertical to longitudinal or horizontal slopes of the protective device are about 1:3. Also, in preferred form, the protective device in plan view is generally oval, with the major axis thereof extending longitudinally of the tank.

In further detailed aspect, the spaced relation between the terminations of the forward and rearward slopes and the tank is in the range of one-half inch to one inch, and preferably is about one inch.

In one form of the invention the protective device has an integral annular rib within the central opening, the rib cooperating in mounting the device in engagement with the tank. In this form, the annular rib is clamped between a conventional universal flange secured to the tank and an auxiliary flange detachably related to the universal flange. The other form of protective device described herein includes an auxiliary flange secured to the device within the central opening as by welds, the auxiliary flange being adapted to be detachably mounted on a universal flange secured to the tank.

Other object, advantages and features of the invention will be apparent as the description proceeds, reference being had to the accompanying drawings wherein preferred forms of the invention are shown. It will be understood that the description and drawings are illustrative only, and that the scope of the invention is to be measured by the appended claims.

BRIEF DESCRIPTION OF THE DRAWINGS

FIG. 1 is a fragmentary perspective view of a portion of a mobile tank with a protective device embodying the invention shown in effective relation with the tank.

FIG. 2 is a transverse sectional view taken generally on line 2—2 of FIG. 1, the view also showing a bottom dicontinuity on the tank and structure which cooperates to mount the protective device in engagement with the tank and in effective relation with the bottom discontinuity.

FIG. 3 is a fragmentary longitudinal sectional view of a tank having a bottom discontinuity with a modified form of protective device shown in effective relation therewith.

FIG. 4 is a side elevational view, partly broken away, of the protective device shown in FIG. 3.

FIG. 5 is a top plan view of the protective device shown in FIG. 1, the view having contour lines A–D which are referred to in FIG. 6.

FIG. 6 is a side elevational view of the protective device shown in FIG. 5, the view showing contours designated by contour lines A–D in FIG. 5.

DETAILED DESCRIPTION

As will be seen, two forms of the protective device embodying the invention are illustrated and described herein. The two forms basically are identical, the only difference residing in structure which cooperates in mounting the protective device in engagement with a tank and in effective relation with a bottom discontinuity on the tank.

One form of protective device embodying the invention is shown in FIGS. 1, 2, 5 and 6, and the other form is shown in FIGS. 3 and 4.

Referring first to FIGS. 1 and 2, a protective device 10 is shown in engagement with a fragmentary portion of a mobile tank 11. The longitudinal center line of the tank bottom is designated 12, and it will be noted that the illustrated protective device 10 is disposed generally on center line 12, as it would be for a bottom discontinuity located on the center line.

Protective device 10 is a shaped metal plate 15, preferably a steel casting, having a central opening 16. Plate opening 16 is aligned generally with an opening 18 in tank 11, the tank opening 18 being related to a bottom discontinuity generally designated 20 (FIG. 2) which may be a portion of a bottom outlet valve.

Referring to FIG. 2, the bottom discontinuity 20 shown by way of example includes a so-called universal or E-15 flange 21 secured to tank 11 as by welds 22 and 23, an auxiliary flange 25 is general alignment with universal flange 21 and a portion 26 of a bottom outlet valve. The latter is secured to auxiliary flange 25 by welds 27 and 28. As shown, universal flange 21 has a downwardly extending annular rib 30, while auxiliary flange 25 has a cooperating upwardly facing annular recess 31 containing a gasket, the rib 30 entering the recess 31 to establish proper alignment and sealing between the flanges 21 and 25.

Auxiliary flange 25 is detachably related to universal flange 21 by means of bolts 33, one of which is shown at the right of FIG. 2, arranged in a conventional bolt ring.

The parts of a bottom discontinuity 20 such as flanges 21 and 25 and bottom outlet valve portion 26 are the parts which generally require protection against damage caused by an accident. The same is true of the tank 11 itself which is subject to deformation in consequence of severe impact on protective device 10.

As shown in FIGS. 1 and 5, protective device 10 is generally elongated and in plan view has a periphery free of any sharp corner. As shown, device 10 (or plate 15) is generally oval, and the major axis thereof extends longitudinally of tank 11. Central opening 16 of plate 15 encloses those parts of bottom discontinuity 20 which require protection from damage in the event of an accident, as shown in FIG. 2.

As best shown in FIG. 3, and to a lesser extent in FIG. 2, there may be additional structure 36 in connection with a bottom discontinuity 20, but structure 36 does not require protection for the reason that it is designed to shear off without release of tank contents when subjected to impact in an accident. A conventional shear plane 38 is shown in FIG. 3, the additional structure 36 being detachably secured to auxiliary flange 25a by means of bolts 39, one of which is shown at the left in FIGS. 2 and 3, arranged in a conventional bolt ring. The bolts 39 shear off and release structure 36 when the latter encounters impact in an accident.

Plate 15 of protective device 10 has its tank-engaging surface 40 (FIG. 5) shaped to receive the curved contour of tank 11. The contour of the bottom surface of tank 11 may be a portion of a cylinder, an oval, or some other curved shape. Whatever the shape, it is desirable that surface 40 of plate 15 have the corresponding shape so plate 15 may engage the surface of tank 11 over most if not all of the area of the plate. An indication of the curved shape of surface 40 will be understood from a consideration of the contour lines A–D shown in FIGS. 5 and 6.

Still referring to FIG. 6, and to a lesser extent to FIG. 1, undersurface 45 of plate 15, that is, the surface of protective device 10 which faces away from tank 11, tapers toward tank 11 forwardly and rearwardly from central opening 16 on vertical to horizontal slopes which terminate in spaced relation with tank 11. The forward and rearward slopes preferably are about 1:3, as suggested by AAR, although, of course, they could be shallower.

As shown in FIGS. 5 and 6, wherein the slopes on contour lines A, B, C and D remote from tank 11 are uniform, the forward and rearward margins of plate 10 are more or less semicircular, the curvatures corresponding with the curvatures of central opening 16. Thus, plate 15 in plan view is generally oval and, as previously mentioned, the major axis of plate 15 extends longitudinally of tank 11.

The slopes of plate undersurface 45 in all cases terminate in spaced relation with tank 11. Referring to FIG. 6, the spaced relation on contour line A is designated by distance 46 between broken lines 47 and 48. This distance is substantially the same for all slopes, and should be in the range of about one-half inch to one inch. It presently is preferred that distance 46 be about one inch in order not to exceed the AAR specification which states that any projection from a tank bottom surface in excess of one inch requires a protective device. Further, as will be seen, the one inch distance maximizes the radii of the convex curves which define the curved undercut periphery of plate 15 which is free of any corner facing tank 11.

Thus, still referring to FIG. 6, right-hand end, convex curve 50 at the plate periphery on contour line A which extends from a point of tangency with plate surface 40 substantially to the termination of the sloped opposite surface 45 may have a radius of about one inch. The same radius of curvature, of course, is present substantially throughout the entire periphery of plate 15 in the illustrated form of the invention. Thus, in response to severe impact applied to protective device 10 in an accident, device 10 could be pushed into and thus deform tank 11. However, the deformation occurs around a portion of the curved undercut periphery, whereby the tank deformation generally corresponds with the curvature 50, the deformation being of such shape and magnitude that rupture of the tank is avoided.

Having described the overall shape of plate 15 of protective device 10, the structure involved in mounting device 10 on a tank 11 now will be described.

Referring to the form of the invention shown in FIGS. 1, 2, 5 and 6, the wall of central opening 16 of plate 15 has an integral annular rib 55, best shown in FIG. 1. In mounting protective device 10 in engagement with tank 11, annular rib 55 is clamped between universal flange 21 (FIG. 2), which is secured to tank 11, and auxiliary flange 25 which is detachably related to universal flange 21 by means of bolts 33. As shown, auxiliary flange 25 has a peripheral recess 52 in the surface facing universal flange 21, the rib 55 being received in clamped relation within the recess. Thus, protective device 10 quickly and easily is able to be mounted on tank 11 in effective relation with a bottom discontinuity 20 and in engagement with tank 11.

In the form of the invention shown in FIGS. 3 and 4, slightly different mounting structure is employed.

Referring first to FIG. 3, the illustrated protective device is designated 10a. Device 10a basically is the same as device 10 shown in FIGS. 1, 2, 5 and 6, the only difference being that protective device 10a does not have an integral annular rib within its central opening 16a. Rather, auxiliary flange 15a is disposed within central opening 16a, and secured to plate 15a by suitable means such as welds 60, one which is shown at the left in FIG. 3. Thus, protective device 10a is mounted in engagement with tank 11 by means of bolts 61, one of which is shown at the right in FIG. 3, arranged in a conventional bolt ring. Bolts 61 provide the desired detachable relationship between universal flange 21 and auxiliary flange 25a. Again, protective device 10a quickly and easily is mounted on tank 11, either a new tank or an existing tank.

The previously mentioned understructure 36 shown in FIG. 3 may be the control mechanism for a bottom outlet valve. As mentioned, this mechanism is adapted to be sheared off in the event of accidental impact without causing the valve to open. The parts of the valve that could cause the valve to open in an accident are the parts that are protected effectively by protective devices 10 and 10a of the invention.

The forward and rearward slopes on the undersides 45 and 45a of the protective devices 10 and 10a serve as inclined skids to divert a portion of encountered accidental impact from bottom discontinuity 20. Bottom discontinuity 20 is protected by the protective device from receiving the residual impact, and any residual impact which is severe enough to deform tank 11 causes the tank to bend around curves 50 on a gentle curvature of the tank which is of such shape and magnitude that rupture of the tank is avoided, thereby preventing release of tank contents both from the bottom discontinuity and from a tank rupture.

From the above description, it is believed that the construction and advantages of the invention will be readily apparent to those skilled in the art. Various changes in detail may be made without departing from the spirit or losing the advantages of the invention.

Having thus described the invention, what is claimed as new and desired to secure by Letters Patent is:

1. A protective device for a mobile tank having a bottom discontinuity projecting therefrom and being susceptible in an accident to impact damage that could permit release of tank contents, the combination comprising a first flange encircling the bottom discontinuity and being disposed against the tank and secured thereto, a second flange encircling the discontinuity and being disposed against said first flange, means for fastening said first flange to said second flange, said second flange having a circumferentially extending recess therein open toward said first flange, a protective device including a central portion having a central opening therein in which said first and second flanges are located, said central portion having a rib that projects inwardly into said central opening and substantially matches the shape of said recess and is located therein, said protective device further including a plate portion having a surface disposed away from the tank and tapering toward the tank forwardly and rearwardly of the tank from said central opening on slopes which terminate in spaced relation with the tank, said plate at the terminations of said slopes being continuously curved toward the tank on convex curves to define a curved undercut periphery free of any corner facing the tank, whereby in consequence of severe impact on the protective device, the tank deforms around a portion of the curved undercut periphery, the deformation being of such shape and magnitude that rupture of the tank is avoided.

* * * * *